United States Patent Office 3,385,810
Patented May 28, 1968

3,385,810
BITUMEN COATING COMPOSITIONS
Richard C. Barrett, New Milford, N.J., assignor to Allied Chemical Corporation, New York, N.Y., a corporation of New York
No Drawing. Filed Mar. 4, 1965, Ser. No. 437,295
11 Claims. (Cl. 260—28.5)

ABSTRACT OF THE DISCLOSURE

The invention more particularly relates to bitumen coating compositions having substantially improved application and drying properties and producing coatings of improved properties including resistance to ultra violet rays and "alligatoring" resulting therefrom, said coating compositions comprising volatile solvent solutions of a bitumen coating material having softening point between 110° F. to 250° F. and between about 1–60% by weight of an oxychlorohydrocarbon polymer from the group of oxychloropolyethylene, oxychloropolypropylene, oxychlorocopolymers of ethylene and propylene and oxychlorinated vinyl chloride polymers, said oxychloropolymers containing between 55–85% by total weight of chlorine and 0.3–3% chemically combined oxygen based on weight of the total oxygen and carbon in the oxychloropolymer, and having molecular weight corresponding to an intrinsic viscosity between about 0.08 to 1.0 in o-dichlorobenzene at 100° C.

---

This invention relates to coating materials and more particularly to new and improved coating compositions based on bitumen materials.

Bitumen materials such as coal tar pitch are employed in solvent solution as coating and paint compositions especially adapted for heavy duty applications such as in the protection of cast-iron pipe, fittings, etc. While the bitumen coatings have enjoyed general success in industry they have certain characteristic properties which can be much improved. For example, the bitumen coatings are notoriously slow in drying properties and also produce a finished coating which is subject to a deformation known as "alligatoring" when exposed to the elements. The "alligatoring" effect results when an unmodified bitumen coating is subjected to ultra violet rays and to weathering. Both these disadvantages constitute economic factors in the use of bitumen coatings and decrease their desirability in many applications. The bitumen coatings are also characteristically non-viscous materials which are not thixotropic and are therefore ordinarily applied as thin films. The bitumen coating compositions may also contain filler materials which tend to settle from the non-thixotropic compositions after storage for only a short time. It has been proposed in the past to add inert colloidal fillers such as silica to obtain thixotropic properties and thicker films on application of the compositions. However, even such inert fillers tend to affect only solution properties and generally exist in the finished coating as an expensive additive which does not benefit other properties of the coating.

An object of the invention is to provide new and improved bitumen coating compositions.

Another object of the invention is to provide bitumen coating compositions having markedly improved drying times and which produce coatings having improved resistance to ultra violet rays and weathering and in which the tendency toward "alligatoring" is inhibited.

Another object of the invention is to provide bitumen coating compositions having thixotropic properties.

A further object of the invention is to provide bitumen coating compositions having improved application and drying properties and which form coatings of superior outdoor stability.

Other objects and advantages will be evident from the following description of the invention.

In accordance with the present invention it has been found that bitumen coating compositions of markedly improved and superior properties are provided by incorporation of a chlorinated mono-olefin polymer or chlorinated vinyl chloride polymer having a chlorine content of at least about 55% up to 85% by weight and molecular weight corresponding to an intrinsic viscosity between about 0.08 to 1.0 in o-dichlorobenzene at 100° C., preferably an oxychloropolymer of a high density, linear or substantially linear polyethylene, said chlorinated polymer being present in an amount between 1% to 60% by total weight of the polymer and bitumen. A particularly desirable feature of the invention is the fact that the incorporation of the chlorinated polymer effects a substantial reduction in drying time of the bitumen coating solutions and also produces a finished coating having superior resistance to weathering as evidenced by long term exposure to the elements without the "alligatoring" effect encountered with the unmodified coatings. An added feature of the invention is that the incorporation of the chlorinated polymer also enables the provision of thixotropic stable bitumen coating compositions which have superior flow and application properties.

The present invention is generally applicable to coating compositions containing or based on bitumen. A number of suitable bitumen coating materials are well-known and include, by way of illustrations, the coal tar pitches, flowable tars, solvent cutbacks, petroleum pitch, gas tars and the like. Generally, the suitable bitumen coating materials are characterized by having a softening point between about 110° F. up to about 250° F., more usually between about 120° F. to 220° F., as determined by the well-known ring and ball method. The more preferred materials are the coal tar pitches and flowable tars. Many of these bitumens contain benzol insolubles which it has been found desirable to remove when brilliance of the coating or paint is an important factor.

The chlorinated polymers employed in the coating compositions may be derived from normally solid ethylene or propylene polymers and copolymers by addition of chlorine in an amount between about 55% to 85% by total weight of the polymer, preferably between about 60–78% by weight. Also suitable are the after-chlorinated vinyl chloride polymer prepared by addition of at least 3% by total weight of chlorine to the vinyl chloride polymer. The more preferred after-chlorinated vinyl chloride polymers are those having a total chlorine content between about 65–78% by weight. To obtain good compatibility with the bitumen and assure practical solution coating viscosities it is particularly desirable to employ the chlorinated polymers having specifically limited molecular weight corresponding to an intrinsic viscosity between about 0.08 to 1.0 in o-dichlorobenzene at 100° C. Particularly good results are obtained with the chlorinated polymers having molecular weight corresponding to intrinsic viscosities between about 0.1 to 0.4 in o-dichlorobenzene at 100° C. Particularly preferred as giving excellent results are the oxychloropolymers and especially the oxychloropolyethylenes derived by addition of both chlorine and oxygen to the high density linear or substantially linear polymers of ethylene. The suitable oxychloropolymers contain chemically combined oxygen in an amount of about 0.3–3%, preferably 1–2%, by total weight of the oxygen and carbon in the oxychloropolymer.

The amount of the chloropolymer combined with the bitumen may be varied over a fairly wide range depending largely on the desired properties and use of the composition. As little as 1% by weight of the total of bitumen and the chloropolymer may be employed to effect improvement in drying time of the coating solution and weathering properties of the resulting coating. Quantities between about 3–30% by weight are particularly effective in providing solution coating compositions and paints which have superior application properties including ability to thin on application of shearing forces, i.e. thixotropic properties. Increasing the amount of the chloropolymer results in further improvement in drying time and weathering properties such that paints containing 30–60% by weight of the chlorinated polymer will produce very stable coatings which dry-to-handle in as little as 25 minutes or less in contrast to the unmodified coatings which require 10 or more hours.

The coating compositions of the invention may be readily prepared by dissolving the chlorinated polymer and bitumen in a volatile solvent with agitation sufficient to provide a homogeneous composition. The mixing operation may be conveniently carried out at room temperature although higher temperature may of course be employed. Suitable volatile solvents include the low boiling mononuclear aromatic hydrocarbons, cycloaliphatic saturated and unsaturated hydrocarbons, the lower aliphatic ketones and esters having usually 2 to 6 carbon atoms, preferably 3 to 4 carbon atoms, the chlorine-containing lower aliphatic compounds of 1 to 3 carbon atoms, the glycol ethers and the various volatile petroleum and coke oven solvents. Examples of such high volatile solvents include xylene, toluene, benzene, cumene, light petroleum aromatics, carbolic oil residues from coal tar distillation, cyclohexene, methyl cyclohexene, methyl isobutyl ketone, acetone, methyl ethyl ketone, cyclohexone, tetrahydrofuran, ethyl acetate, butyl acetate, ethylene glycol monobutyl ether, carbon tetrachloride, and trichloroethylene. The more preferred solvents include xylene, toluene, petroleum aromatics and the oil residues from coal tar distillation. Mixtures of solvents may be employed and it is generally preferred to add the chlorinated polymer as a solution in xylene to the bitumen which has been cutback with a mineral oil as conventional in the bitumen coating materials. The total solids content as represented by the chlorinated polymer and bitumen may vary between about 30–85% by total weight of the coating solution depending upon the particular application in which it is to be employed.

The oxychloropolymers, particularly the oxychloropolymers of linear polyethylene, are especially preferred for use in the invention because of their superior coating properties and ease of preparation.

The suitable oxychloropolyethylenes are thermally stable, non-gelling materials which may be produced by subjecting substantially linear high density polyethylene to controlled oxidation and chlorination in a suitable medium. Preferably, the oxychloropolyethylenes are produced by chlorination of the high density polyethylene in aqueous slurry in the presence of molecular oxygen which is supplied along with the chlorine during a part or all of the chlorination in a controlled amount sufficient to add the desired amount of oxygen to the polymer. Usually, the oxygen is present during only a portion of the chlorination and added after the initial 5% chlorine has been added to the polymer. Once the oxygen is added it is desirable to conduct the chlorination substantially continuously and to completion in the presence of oxygen with exception of any period during which the temperature is above the crystalline melting point of the polyethylene starting material. Oxidation up to time of completion of the chlorination is believed to be a factor in the manner in which oxygen is introduced into the oxychloropolyethylene and influences the properties of the product. Such terminal oxidation produces the more thermally stable products, particularly from the lower and intermediate molecular weight polyethylene starting materials. The total amount of oxygen employed in preparing the oxychloropolyethylenes is between about 0.5% to 5.0%, preferably between 1.0–3.0%, based on the weight of the polyethylene starting material, depending largely on the desired oxygen and chlorine content of the oxychloropolyethylene and the molecular weight of the polyethylene starting material and oxychloropolyethylene product. The oxychloropolyethylenes containing an amount of chemically combined oxygen between about 1–2% by weight of the total oxygen and carbon in the oxychloropolyethylene are usually preferred. Temperatures employed during chlorination and oxidation are generally within the range of about 25–160° C., preferably between about 80–150° C.

The oxychloropolyethylenes preferred for use in the present invention are prepared by oxidation and chlorination of a linear, high density polymer of ethylene. The terms "linear" or "substantially linear," as used herein and the appended claims, shall mean a polyethylene characterized by high density and at most only nominal short chain branching in the form of methyl groups, usually less than about 10 methyl groups per 1,000 carbon atoms. Particularly good results are obtained when employing the oxychloropolyethylenes which are derived from or produced by chlorination and oxidation of high molecular weight polyethylene prepared in accordance with the process described in British Patent 858,674 of Jan. 11, 1961 to Allied Chemical corporation. By such a process a crystalline, high density polyethylene is prepared by gas phase polymerization of an anhydrous oxygen-free ethylene over a porous frangible supported catalyst prepared from an inorganic compound of chromium and oxygen and an active metal alkyl. The catalyst support is prepared from silica or silica-alumina. The ethylene polymers produced in accordance with the above-referred to British patent have a crystallinity of at least about 75%, usually between 75% and 85%, as measured by differential thermal analysis, a high density between 0.935 and 0.985 grams/ml., and a weight average molecular weight of at least 700,000, usually between about 1.0 million to 5.0 million, as calculated according to the method of P. S. Francis et al. from the viscosity of about a 0.05 to 0.1 gram per 100 cc. solution in Decalin using the equation:

$$[n] = 6.77 \times 10^{-4} M^{0.67}$$

where $[n]$=intrinsic viscosity
$M$=weight average molecular weight (J. Polymer Science vol. 31, pp. 443–466—September 1958.) The high molecular weight polyethylenes produced in accordance with Example 6 of the above-referred to British patent are linear materials which, however, may also be characterized by containing long chain linear polyethylene branches. These high molecular weight polyethylenes have a Melt Index less than 0.10 according to ASTM D1238–52T at 190° C. with a 2160 gram weight; tensile strength values of the order of about 5,000 p.s.i. according to ASTM D412–51T; ultimate elongation of at least 350 p.s.i., generally of the order of 370–470 p.s.i., according to ASTM D412–51T, and high impact strength of at least 15 ft.-lbs./in. of notch, usually between 15–25 ft.-lbs./in. notch, according to ASTM D256–54T (Izod).

The oxychloropolyethylenes of higher chlorine content above about 70% by weight are preferably prepared from the ethylene polymers of ultra high molecular weight of at least 700,000 by chlorination in aqueous slurry in three stages with oxygen present in at least the third stage and in any event at the termination of the chlorination but absent from the second stage. In the first stage of such process chlorination is conducted at a temperature below about 120° C., preferably between 80–110° C., until at least 10%, preferably 17%, by weight chlorine is added to the polyethylene. The first stage chlorination may be conducted in the presence of oxygen, which is desirably continuously present until such stage is completed in an amount representing a minor percentage of the total oxygen to be employed. In the second stage the chlorination is continued in the absence of oxygen at a temperature above the crystalline melting point of the polyethylene, usually at least about 135° C., preferably between 135–150° C., until at least about 20%, preferably 25%, by weight chlorine has been added to the polymer. In the third stage chlorination is continued below the crystalline melting point, preferably between 100–120° C., until the desired amount of chlorine is added to the polymer. The remaining, predominant amount of oxygen is present continuously present during the third stage. Both oxidation and chlorination to the higher chlorine levels above about 60% by weight chlorine cause breakdown or splitting of the long ethylene polymer chains as well as the addition of oxygen and chlorine to the polymer structure. Hence, a reduction in molecular weight to some extent offsetting the increase effected by addition of chlorine is realized by oxidation generally and by chlorination to the higher chlorine levels. Thus, while oxychloropolyethylenes of the desired molecular weight may be therefore produced from ultra high molecular weight polyethylene, the amount of oxygen employed should not be excessive to avoid producing a product of undesirably low molecular weight, particularly when chlorinating to the higher chlorine levels where chlorination itself becomes an important factor in determining molecular weight of the product.

Oxychloropolyethylene giving especially good results may also be produced from intermediate molecular weight polyethylene derived by a thermal degradation process from the ultra high molecular weight polyethylene produced in accordance with British Patent 858,674. By means of such degradation process, also described in said patent, the high molecular weight polyethylene is thermally degraded or depolymerized by heating of the polymer at temperatures of the order of about 350–400° C. in the absence of oxygen. If desired, shearing forces may be applied during the depolymerization. The polyethylene materials produced from the high molecular weight polymers by thermal depolymerization are substantially linear materials having molecular weight within the range of about 30,000 to 300,000, more usually between 40,000 to 200,000, and a density between about 0.935 to 0.985 gm./ml. Such intermediate molecular weight polyethylenes are preferably employed in preparation of the oxychloropolyethylenes containing less than about 70% by weight chlorine. The oxychloropolyethylenes employed in the invention are desirably produced from the polyethylene of intermediate molecular weights by chlorination at temperatures between about 80–120° C., preferably between about 90–110° C., with oxygen present during only a portion of the chlorination period up to its completion, preferably during addition of about the last 3–15% of the total chlorine to be added to the polymer.

Pigments and filled may also be added to the coating compositions in amounts ranging up to about 250 parts by weight per 100 parts of chlorinated polymer. On a volume basis of the amount of such fillers usually does not exceed about 35% of the total compositions as is conventional with the bitumen coating solutions. Examples of suitable pigments are titanium dioxide, red lead, carbon black, etc. Suitable fillers include calcium carbonate, kaolin, clay, magnesium silicate, slate flour, etc. While not a necessity for most applications, the coating compositions may also include stabilizers for the chlorinated polymers and scavengers or acceptors for hydrogen chloride present in the resins. Suitable stabilizers are those generally employed with the vinyl polymers, including, for example, the organic complexes and/or metallic salts. The usual small quantities of stabilizer are effective, for instance, 2 to 10 parts per 100 parts of resin. Suitable scavengers include the liquid epoxy resins such as those produced by reaction of epichlorohydrin and Bisphenol-A. Usually between 1 to 5 parts of such scavengers per 100 parts of resin are effective.

The following examples in which parts and percentages are by weight unless otherwise indicated demonstrate the practice and advantages of the present invention.

Example 1

Polyethylene of about 50,000 weight average molecular weight was prepared by thermal depolymerization of a 1.6 million molecular weight linear polyethylene prepared by gas phase polymerization of anhydrous oxygen-free ethylene over a catalyst of magnesium dichromate on a porous support with aluminum triisobutyl. The support was composed of silica. The depolymerized polyethylene and high molecular weight polyethylene were prepared in accordance with British Patent 858,674. The depolymerized polyethylene was slurried in about 17 times its weight of water in an enclosed glass lined reactor and chlorinated at a temperature of about 100° C. over the course of about 38 total hours by introduction into the slurry of chlorine at a rate of about 0.106 pound of chlorine per hour per pound of polyethylene charged. After about 65% chlorine had been added to the polyethylene the chlorination was conducted in the presence of oxygen by introducing molecular oxygen into the slurry at a uniform rate in an amount equivalent to about 2.5% total oxygen based on the weight of the polyethylene charged. The resulting slurry was filtered and the product washed and dried at a temperature of about 60° C. for about 24 hours. The product was an oxychloropolyethylene having a chlorine content of 70% by total weight of the product and an oxygen content of 1.54% based on the total weight of oxygen and carbon in the oxychloropolyethylene. The product also had a weight average molecular weight corresponding to an intrinsic viscosity of about 0.20 as measured in o-dichlorobenzene at 100° C. About 40 grams of the chlorinated polyethylene was dissolved in 80 grams xylene and the resulting solution admixed with agitation at room temperature with a bitumen composition comprising a solution of 28 grams of a soft pitch dissolved in 12 grams of a mixture of about 75% light carbolic oil residue and about 25% coal tar oil. The oxychloropolyethylene represented about 58% by weight of the total of the bitumen and oxychloropolyethylene. Softening point of the pitch was 130–135° F. by ring and ball method ASTM D36–26. The coal tar oil solvent had a specific gravity of 0.930. After about 10 minutes mixing there was formed a homogeneous composition which was painted on to flat steel test panels to give a coating of 5–7 mils thickness. The coating was found to be tack-free after only 10 minutes from the time of application and was also dry-to-handle after only 20 minutes from the time of application. An unmodified bitumen coating was prepared by mixing 40 grams of the same pitch composition in about 60 grams of xylene. This solution was similarly coated onto steel test panels and found to have a tack-free time of 90 minutes and dry-to-handle time of 48 hours. A comparison of the two bitumen coating compositions shows that the composition of the invention becomes tack-free about 9 times as fast as the conventional coating and is dry-to-handle approximately 140 times as fast. The test panels above prepared were then subjected to weathering tests by placing outdoors for a period of 3 summer months. At the end of the period the conventional tar coating was found to be badly cracked and extensively alligatored while the specimens coated with the composition of the invention exhibited no surface defects.

Example 2

The polyethylene of 1.6 million molecular weight as employed in Example 1 was slurried in about 17 times its weight of water in an enclosed glass lined reactor and chlorinated at a temperature of about 100° C. over the course of about 25 total hours by introduction into the slurry of chlorine at a rate of about 0.110 pounds of chlorine per hour per pound of polyethylene charged. After about 35% by weight chlorine had been added to the polyethylene the chlorination was conducted in the presence of oxygen by continuously introducing molecular oxygen into the slurry at a uniform rate in an amount equivalent to about 2.5% total oxygen based on the weight of polyethylene charged. The resulting slurry was filtered and the product washed and dried at a temperature of 60° C. for 24 hours. The product was an oxychloropolyethylene having a chlorine content of about 69% by weight of the total polymer and an oxygen content of about 1.3% based on the weight of oxygen and carbon in the oxychloropolyethylene. The oxychloropolyethylene product also had a molecular weight corresponding to an intrinsic viscosity of about 0.3 as measured in o-dichlorobenzene at 100° C. A 20% solution of the oxychloropolyethylene was prepared by dissolving two parts of the oxychloropolymer in 8 parts of xylene. This solution was then admixed with agitation at room temperature with 100 parts of a commercially available filled coal tar pitch coating solution containing 43% by volume coke oven pitch obtained by straight run distillation and having a softening point of about 150–155° F., about 20% by volume of a coal tar solvent boiling substantially in the range between 135–220° C., and about 37% by volume of slate flour as filler. A homogeneous composition was formed after about 10 minutes mixing and contained about 3.5% by weight of the oxychloropolyethylene based on the weight of the bitumen and oxychloropolymer. The resulting composition was found to be thixotropic as determined by Brookfield Viscometer measurements of viscosity at increasing rates of speed. The viscometer measurements showed that the composition had a viscosity of 1000 centipoises at 2 r.p.m. and a viscosity of only 234 at 20 r.p.m. The composition was also allowed to stand and after one month showed no settling of the slate flour filler. Coated specimens were produced by calendering the composition onto steel test panels to form a 12–13 mils thick wet film which was found to be tack-free 45 minutes from the time of application and also dry-to-handle after only 120 minutes from the time of application. For purposes of comparison a conventional coal tar pitch coating based on the same commercially available coal tar pitch was prepared. The resulting coating composition was non-thixotropic and it was found that a ½ inch layer of slate flour filler settled on the bottom of a one quart can of the coating composition after quiescent standing for a period of only one month. Upon calendering onto steel test panels of a 12–13 mils thick wet film it was found that conventional coal tar pitch composition required 120 minutes to be tack-free and a time of about 48 hours to become dry-to-handle. Additional steel panels coated to form 2–3 mils thick films with each of the two compositions were placed alternately in a standard Atlas Weatherometer operating at 1 r.p.m. and subjected for 110 hours to repeated cycles of 51 minutes of high intensity light and 9 minutes of light and cold water (14.4° C.). Examination of the specimens from the weatherometer showed that the conventional coal tar coating was severely cracked and alligatored while only slight surface defects were observed with the composition prepared by addition of only about 3.5% of the oxychloropolyethylene.

Example 3

Branched polyethylene having a molecular weight of about 5000 and a density of about 0.92 was slurried in about 17 times its weight of water and chlorinated over the course of about 25 total hours to a total chlorine content of about 68%. After about 60% chlorine had been introduced into the polymer the chlorination was conducted in the presence of oxygen by introduction of molecular oxygen at a uniform rate in a total amount equivalent to 1.6% based on the weight of the polyethylene charged. The resulting oxychloropolyethylene had a molecular weight corresponding to an intrinsic viscosity of about 0.1 in o-dichlorobenzene at 100° C. The oxychloropolyethylene was dissolved in xylene and admixed with agitation with a 74% solids xylene solution of a coal tar pitch having a softening point between 145–150° F. as determined by the ring and ball method. After about 10 minutes mixing at room temperature there was formed a homogeneous solvent composition containing about 37.1% of the coal tar pitch solids and 9.5% of the oxychloropolyethylene. The oxychloropolyethylene was present in an amount of about 20.5% based on the total weight of coal tar pitch and oxychloropolymer. The solvent composition which was found thixotropic as determined by a Brookfield Viscometer, was then painted onto flat steel test panels to form coatings having a thickness of about 12–13 mils. The coating solution was found to be tack-free in only about 15 minutes and also to be dry-to-handle after only about 40 minutes. A similar xylene solution of the same coal tar pitch prepared without the addition of the oxychloropolyethylene was found to require two hours after application before it was tack-free and about 12 hours before it was dry-to-handle. Comparison tests were made in the Atlas Weatherometer for 242 hours following the heat and water cycles of Example 2 and it was found that the oxychloropolyethylene modified coal tar pitch coating was free of alligatoring and surface defects while the unmodified coating was heavily alligatored.

Example 4

The same depolymerized polyethylene of 50,000 weight average molecular weight employed in Example 1 was chlorinated employing procedures similar to Example 1 to the total chlorine content of about 70%. Molecular oxygen was introduced at a uniform rate after the addition of 65% chlorine in a total amount equivalent to about 2.5% based on the weight of the polyethylene charged. The resulting oxychloropolyethylene product had an intrinsic viscosity of about 0.2 in o-dichlorobenzene at 100° C. The oxychloropolyethylene was dissolved in xylene and admixed with the same coal tar pitch employed in Example 3 to give a homogeneous coating solution containing 37.1% pitch solids, 9.5% of the oxychloropolyethylene and 53.4% xylene. The oxychloropolyethylene was present in amount of about 20.5% based on the total weight of coal tar pitch and oxychloropolymer. The composition was thixotropic as determined by the Brookfield Viscometer. Upon coating onto flat steel specimens the oxychloropolyethylene modified composition was found to be tack-free after only 7–10 minutes and dry-to-handle in only 30 minutes. A comparison with the unmodified coal tar pitch composition shows the oxychloropolyethylene modified composition to be at least 12 times faster in producing a tack-free coating and about 24 times faster in producing a coating which is dry-to-handle. The steel specimens coated with the modified and unmodified compositions were subjected to the Atlas Weatherometer tests employing the procedures and cycles the same as in Example 3. After 184 hours in the Weatherometer the unmodified coating was severely alligatored while the oxy-

Example 5

Commercially available polyvinyl chloride having an intrinsic viscosity of 0.48 in o-dichlorobenzene at 100° C., a chlorine content of 56.7% by weight, and a particle size of about 100 to 400 microns, was slurrried in about 12 times its weight of water in a glass-lined, steel pressure vessel equipped with mixing means. The vessel was sealed and purged with nitrogen. The aqueous suspension of polymer was heated to 140° C. and chlorine was added at a rate of 0.294 pound per hour per pound of polyvinyl chloride while agitating the suspension. The chlorination was continued for 2.55 hours, at which time the chlorine content of the polymer had been increased to 68.4%. Molecular oxygen was introduced at a uniform rate after addition of 65% chlorine and to completion of the chlorination in a total amount equivalent to about 2% based on the weight of the weight of the polyvinyl chloride charged. The system was then purged with nitrogen and cooled to room temperature. The acid formed during the reaction was pumped out of the system and the chlorinated polymer washed with water. The polymer was then removed from the pressure vessel and centrifuged, following which it was again washed with water to remove residual acid. The chlorinated polyvinyl chloride was next dried in a rotary vacuum drier to give a free-flowing granular product having a glass transition temperature of about 131° C. The oxy-chlorinated polyvinyl chloride product had a chlorine content of 68.4% by weight and an oxygen content of about 1.5% by total weight of the product. The oxy-chlorinated polyvinyl chloride was dissolved in xylene and admixed with the same coal tar pitch employed in Example 3 to give a homogeneous coating solution containing 37% pitch solids, 9.5% of the oxy-chlorinated polyvinyl chloride and 53.5% xylene. The oxy-chlorinated polyvinyl chloride was present in an amount of about 20.5% based on the total weight of coal tar pitch and oxy-chlorinated polymer. The composition was thixotropic as determined by the Brookfield Viscometer. Upon coating onto flat steel specimens the oxy-chlorinated polymer modified composition was found to be tack-free after only 7 minutes and dry-to-handle in only 30 minutes. A comparison with the unmodified coal tar composition prepared in Example 4 shows the oxy-chlorinated polyvinyl chloride modified composition to be at least 12 times faster in producing a tack-free coating and about 24 times faster in producing a coating which is dry-to-handle. Steel specimens coated with the modified and unmodified compositions were subjected to Atlas Weatherometer tests employing the procedures and cycles the same as in Example 3. After 44–66 hours in the Weatherometer the unmodified coating was severely alligatored while the oxy-chlorinated polyvinyl chloride modified coating of the invention was free of surface defects after 184 hours in the Weatherometer.

It is well known practice in the art of characterizing macromolecular resins to calculate a molecular weight figure from the figure determined for intrinsic viscosity of the resin. The molecular weight figures thus calculated depend, of course, upon the particular formula used for the calculation and accordingly should be regarded as approximate rather than exact. They represent approximate weight average molecular weights.

Intrinsic viscosity, as the term is used herein, is defined as the limit, at infinite dilution, of specific viscosity ($N_{sp}$) divided by concentration (C) expressed in grams of resin per deciliter of solution. Specific viscosity is measured as: $(t-t_0)/t_0$, where $t$ is the effluent time for a given quantity of polymer solution from a standard pipet and $t_0$ is the effluent time for an equal quantity of the pure solvent. Intrinsic viscosity can be determined, accordingly, by plotting ($N_{sp}$/C) against C, at low concentrations, and extrapolating the resulting curve to 0 concentration.

The intrinsic viscosities reported herein are determined in accordance with ASTM Test D–1601–61, the units thereof being deciliters per gram. Intrinsic viscosities of the chlorine-containing polymers of this invention herein reported are in ortho-dichlorobenzene solvent at 100° C., and for ethylene polymers herein the intrinsic viscosities are in decalin solvent at 135° C.

The densities of polymers reported herein are determined by ASTM Test D–792–60T at 23° C. and are in units of grams per milliliter.

Although certain preferred embodiments of the invention have been disclosed for purpose of illustration, it will be evident that various changes and modifications may be made therein without departing from the scope and spirit of the invention.

I claim:

1. A bitumen coating composition comprising a volatile solvent solution containing: (1) a bitumen coating material having a softening point between about 110° F. to 250° F. by the ring and ball method; and (2) an oxychlorohydrocarbon polymer selected from the group consisting of oxychloropolyethylene, oxychloropolypropylene, oxychlorocopolymers of ethylene and propylene, oxychlorinated vinyl chloride polymers containing at least 3% by weight chemically added chlorine, and mixtures thereof; said oxychlorohydrocarbon polymer having a chlorine content between about 55–85% by total weight and molecular weight corresponding to an intrinsic viscosity between about 0.08 to 1.0 in o-dichlorobenzene at 100° C., and containing between about 0.3–3.0% chemically combined oxygen by weight of the total oxygen and carbon in the oxychloropolymer; said oxychlorohydrocarbon polymer being present in an amount between about 1–60% by total weight of the bitumen and oxychlorohydrocarbon polymer.

2. The composition of claim 1 in which the oxychlorohydrocarbon polymer has a chlorine content between about 60–78% by weight and an intrinsic viscosity between about 0.1 to 0.4 in o-dichlorobenzene at 100° C.

3. The composition of claim 1 in which the bitumen is a coal tar pitch having a softening point between about 120° F. to 220° F.

4. The composition of claim 1 in which the oxychlorohydrocarbon polymer is present in an amount between about 3–30% by total weight of the bitumen and oxychlorohydrocarbon polymer.

5. The composition of claim 1 in which the oxychlorohydrocarbon polymer is an oxychloropolypropylene having a chlorine content between 60–78% by weight.

6. The composition of claim 1 in which the oxychlorohydrocarbon polymer is an oxychlorocpolymer of ethylene and propylene having a chlorine content between about 60–78% by weight.

7. The composition of claim 1 in which the oxychlorohydrocarbon is an oxychlorinated polyvinyl chloride having a total chlorine content between about 65–78% by weight.

8. A bitumen coating composition comprising a volatile solvent solution containing: (1) a bitumen coating material having a softening point between about 110° F. to 220° F. by the ring and ball method; and (2) an oxychloropolyethylene derived by chlorination and oxidation a linear polymer of ethylene, said oxychloropolyethylene having a chlorine content between about 55–85% by total weight of the oxychloropolyethylene, a chemically combined oxygen content between about 0.3–3.0% based on the total weight of oxygen and carbon in the oxychloropolyethylene, and a molecular weight corresponding to an intrinsic viscosity between about 0.08 to 1.0 in o-dichlorobenzene at 100° C.; said oxychloropolyethylene being present in an amount between about 1–60% by total weight of the bitumen and oxychloropolyethylene.

9. The composition of claim 8 in which the bitumen is a coal tar pitch having a softening point between 120° F. to 220° F. by the ring and ball method.

10. The composition of claim 8 in which the oxychloropolyethylene has a chlorine content between about 60–78% by weight, an oxygen content between about 0.1–1.0%, and a molecular weight corresponding to an intrinsic viscosity between about 0.1 to 0.4 in o-dichlorobenzene at 100° C.

11. The composition of claim 8 in which the oxychloropolyethylene is present in an amount between about 3–30% by total weight of the bitumen and oxychloropolyethylene.

References Cited

UNITED STATES PATENTS

| | | | |
|---|---|---|---|
| 2,715,615 | 8/1955 | Del Bell et al. | 260—28.5 |
| 2,930,726 | 3/1960 | Jones et al. | 154—43 |
| 3,031,426 | 4/1962 | Porter et al. | 260—28.5 |
| 3,257,336 | 6/1966 | Levy et al. | 260—2.5 |

MORRIS LIEBMAN, *Primary Examiner.*

H. S. KAPLAN, *Assistant Examiner.*